United States Patent [19]

van Schouwenburg

[11] Patent Number: 4,680,183

[45] Date of Patent: Jul. 14, 1987

[54] PROCESS FOR MAKING A FOOD PRODUCT FROM CHEAP MEAT CHUNKS

[76] Inventor: Gerrit A. van Schouwenburg, 14, ch. de Pierre-Longue, Grand-Lancy, Switzerland

[21] Appl. No.: 763,144

[22] PCT Filed: Dec. 7, 1984

[86] PCT No.: PCT/CH84/00191

§ 371 Date: Jul. 30, 1985

§ 102(e) Date: Jul. 30, 1985

[87] PCT Pub. No.: WO85/02520

PCT Pub. Date: Jun. 20, 1985

[30] Foreign Application Priority Data

Dec. 12, 1983 [CH] Switzerland ................ 6621/83

[51] Int. Cl.⁴ .................................... A23L 1/317
[52] U.S. Cl. ............................ 426/64; 426/272; 426/513; 426/646; 426/645
[58] Field of Search ............ 426/641, 574, 513, 516, 426/517, 249, 272, 644, 645, 646, 802

[56] References Cited

U.S. PATENT DOCUMENTS

| | | | |
|---|---|---|---|
| 3,486,910 | 12/1969 | Saenz | 426/272 |
| 3,642,496 | 2/1972 | Gibson | 426/513 |
| 3,890,451 | 6/1975 | Keszler | 426/641 |
| 3,914,444 | 10/1975 | Svacik | 426/646 |
| 4,107,337 | 8/1978 | Deppner | 426/641 |
| 4,239,785 | 12/1980 | Roth | 426/646 |
| 4,377,597 | 3/1983 | Shapiro et al. | 426/641 |
| 4,378,379 | 3/1983 | Liesaus | 426/513 |

FOREIGN PATENT DOCUMENTS

| | | | |
|---|---|---|---|
| 697166 | 11/1964 | Canada | 426/517 |
| 58-67163 | 4/1983 | Japan | 426/645 |

*Primary Examiner*—Raymond N. Jones
*Assistant Examiner*—Carolyn Paden
*Attorney, Agent, or Firm*—Silverman, Cass, Singer & Winburn, Ltd.

[57] ABSTRACT

The present invention has for object a process for making a food product from cheap meat chunks having a moisture content situated between 30 to 80% and a fat content situated between 1 to 30%. The chunks are comminuted to form a smooth homogeneous paste having a particular size of less than 2 mm. Salt is added to the paste to produce a partial solubilization of the meat proteins. Then slices of a thickness less than 3 mm are formed. The slices are stabilized by a mild heat treatment.

10 Claims, No Drawings

PROCESS FOR MAKING A FOOD PRODUCT FROM CHEAP MEAT CHUNKS

The present invention has for object a process for making a food product from cheap meat lumps having the appearance and the organoleptic qualities of natural meat and having a moisture content situated between 30 to 80% and a fat content situated between 1 to 30%, according to which one removes from the low quality lumps their undesirable parts and comminutes the remaining parts to a smooth homogeneous paste having a particle size of less than 2 mm.

The palatability of meat is determined by the structure of its fibre bundles and by the tissues which connect them. The large muscle fibres consist of many fine fibres which are themselves made from thousands of myofibrils, tiny needle-like particles having a diameter of around 1 micron. Thin sheets of connecting tissues are interwoven with the muscle fibres. So far as the myofibrils are concerned, they include elongated polynucleated cells composed of two proteins, the actin and the myosin, which are responsible for muscular contractions.

The myofibrillar structure of the muscle, as well as the connective collagenic tissues, fibres and tendons, which reinforce the mechanical resistance of the basic contractile structure of the muscle, determines its chewiness and its toughness.

In the processes used up to now for the realization of food products from cheap meat lumps, one has tried to use as far as possible the existing myofibrillar structure or, on the contrary, to rebuild the fibres and to arrange them in such a way that they look like the texture of the muscle.

The present process distinguishes from the known processes in that it does not attempt to preserve or to recreate a structure.

This process is characterized by the fact that one adds salt to the paste so as to produce a partial solubilization of the proteins it contains, then realizes slices of a thickness less than or equal to 3 mm of the paste and then stabilizes the slices by a heat treatment producing a coagulation of the proteins previously solubilized so as to realize a connective network between the particles of the paste, without substantial alteration of these particles.

One will use, for carrying out this process, cheap meat lumps of beef, veal, pork, mutton or poultry, from which one removes as carefully as possible their undesirable parts such tendons, nerves or the like. So far as possible, and if necessary, one will also remove the fat portion of the muscle, but, since this operation is difficult to be executed, it will be preferable to choose, upon starting, lean meat. This removing can be effected mechanically since the structure of the initial material has not to be preserved.

The meat thus cleaned is very finely comminuted. As a matter of fact, it is important not to realize a mere mincing but an actual smooth and homogeneous paste the thickness of grain of which be in the order of 0.3 to 2 mm.

One adds to this paste a small quantity of salt, for instance from 0.5 to 3.5% by "wet" weight, for partially solubilizing the proteins it contains. These solubilized proteins coat the particles constituting the paste. One can also add nitrates, nitrites, ascorbalis or other additives. If desired, one rectifies the taste by adding of spices. It is to be noted that, since the material is a paste, the additives, especially the spices, are mixed fully therethrough. This would not be possible with pieces of meat. The paste is then let to rest in an operation of maturation which contributes the desired colour and which gives the salt time to act. This rest can have very diverse durations going from some minutes to some hours, depending from the quality of the starting materials and of the product which one wants to obtain.

It is to be noted that one can effect a predrying of the pieces of meat before the comminution into a smooth and homogeneous paste and before it is salted. One can also reduce the moisture content by using, upon starting, dried meat or even freeze-dried meat, which is added to the fresh meat, before, during or after the preparation of the paste.

One then makes the slices of paste a thickness lower or equal to 3 mm by means of the said paste, after the maturation rest, either by rolling the paste in a sheet to the thickness which corresponds to the thickness of the slices and while punching these sheets by means of punchers or while using moulds having the shape and the size of the slices to be realized, or still while forming the paste in blocks which are frozen so as to permit them to be sliced to the desired thickness.

The slices thus realized are stabilized by a heat treatment producing a coagulation of the proteins previously solubilized. This realizes a connecting network between the particles or fibres of the paste, without substantial alteration of these particles. This heat treatment will be effected at a temperature situated between 55° and 150° C. during 2 to 120 seconds, for instance, depending upon the method of application, such as by contact, by radiation (infra-red) or by air circulation. A good result has been obtained by means of contact heating at a temperature of 70° to 80° C. during 2 to 10 seconds. It is to be noted that, in the case of contact heating, the material used to this effect has an influence on the appearance of the finished product.

The heat treatment can be prolongated so as to realize a real cook permitting saling pre-cooked slices of meat.

Once the slices are made, it is suitable to imprint thereon, by means of matrixes showing a relief, a relief similar to that of the slices of natural meat. This relief will be imprinted before the heat treatment and set by it. It could also be realized at the same time as the heat treatment when this one is applied by contact. Owing to this relief, the thickness of the slices is not the same throughout, that, so far as the chew is concerned, increases the similarity with the slices of natural meat. In anyway, depending from its depth, this relief will give to the slices the appearance of the natural meat or will modify their "chewiness".

It is to be noted that the degree of the realized solubilization of the proteins determines the physical properties of the finished product: at a low solubilization corresponds a product which tears easily while a high solubilization gives a very elastic product requiring more chewing.

It also to be noted that a particular attention is to be paid to the colour of the finished product, the desired colour being able to be obtained not only by a maturation rest, but also while packing the product under a controlled atmosphere containing nitic oxide gas.

The slices thus realized will be sold fresh and the buyer will use them as slices of meat cut in the muscle, whether it is roast beef, bacon or meat for Chinese fondue which, then, will be preferably sold frozen.

The following examples give indications on the way the present process can be practically carried out:

EXAMPLE 1

Meat for Chinese fondue

Shin meat from veal is passed through a machine which removes therefrom nerves, tendons and connective tissues. The removed materials represent 16 to 20% in weight of the initial material. The meat is then comminuted into a smooth and homogeneous paste and, at the same time, salt in the amount of 1.8% by weight, 1.5 g/kg of salpetre and 0.5 g/kg of ascorbic acid to produce colouration are added. The operation is continued until the diameter of the particles becomes lower than 1 mm. The paste thus realized is pressed, under vacuum, in a casting having a diameter of 70 mm. The product is placed in a press during three days at a temperature of 5° C. that gives it the desired shape, generally a flat oval. The product is then let to rest, for maturation, a further day, still at a temperature of 5° C., after which it is frozen at −4° C. The casting is removed and the product is cut in slices of a thickness of about 1 mm. These slices are placed between printing rollers which are themselves heated at a temperature of 25° to 30° C. These rollers imprint a relief on the slices; the slices are then passed on a conveyor belt under infra-red sources. The surface temperature reaches 70° C. An exposure of 15 to 20 seconds, at this temperature, on each face, will be sufficient. The slices thus heat treated are then frozen till their consumption.

EXAMPLE 2

Smoked bacon

A mixture of lumps of pork having a fat content of 15% and of lean pork is treated in the same way as in example 1. Smoke flavour and colouring agents (salpetre and ascorbic acid) are added as well as 2.8% of salt. After comminuting the product into a smooth and homogeneous paste, this paste is degassed, and the product is allowed to rest for maturation during one day at a temperature of 1° to 6° C. The paste is slightly frozen (−2° C. to −4° C.) and is then rolled out in sheets having a thickness of 1.5 to 2 mm. Slices are punched out by means of a punch from these frozen sheets and passed between belts moving at a speed of 5 m/min., heated at 75° C. These belts show an intaglio or relief pattern which is imprinted on the slices where it is fixated by the heat treatment. After 15 to 20 seconds, the slices are passed over these belts. They are then cooled and packed.

EXAMPLE 3

Turkey slice

Turkey meat is comminuted into an homogeneous paste having an average dimension of particles of 1 to 1.5 mm. 2% of salt are added as well as flavouring agents. The salt is mixed thoroughly to the paste. A laminator is used for reducing the product into a sheet of 1 mm of thickness between two belts heated at a temperature of 70° to 75° C. The sheet is cooled after 60 to 90 seconds. Slices are punched out by means of a punch from this sheet and packed. The scraps are again comminuted to a paste and mixed with the starting material. The belts show intaglio and relief decorative patterns which are imprinted on the slices.

EXAMPLE 4

Fondue meat

Low fat beef trimmings are desinewed mechanically to remove therefrom tendons and connective tissues. Salt (1.5% by weight), salpetre (1 g/kg) and ascorbic acid (0.5 g/kg) are added. This mixture is then comminuted in a cutter until an homogeneous paste is obtained, the particles of which have a size situated between 0.5 and 2 mm. A quantity of 8 g of this paste is deposited on a ring resting on a plate heated at 60° to 70° C., the whole constituting a mould. This mould has the desired shape of the slice. A stamp heated at 65° to 75° C., which fits exactly in the mould flattens the paste till the entire mould is filled. The mould having a surface of 60 cm2. The slice will have a thickness of 1.2 mm. After 2 to 5 seconds, the slice, which is stabilized, is removed. The plate and the stamp show a pattern which is imprinted in the slice. The product has a bright red colour like fresh meat.

EXAMPLE 5

Roast beef

A slice is realized the same way as in example 4, but the lateral ring of the mould in which it is formed is heated at a temperature of 100° to 120° C., while the basic plate constituting the bottom of the mould is heated at 60° to 70° C. This way the slice has the dark brown colour of the cooked meat at its periphery while its central part remains bright red. The product obtained this way is similar to a slice cut from a muscle of beef which has been roasted, remaining red or rare in the middle.

EXAMPLE 6

Cooked Beef

A slice is prepared the same way as in example 4. After stabilization, this slice is put on a conveyor belt and is moved in an infra-red oven heated at a temperature of 70° to 80° C. The slice is treated in 40 to 80 seconds, depending from the temperature of the oven and from the level of coagulation desired.

EXAMPLE 7

Smoked beef

A slice is prepared the same way as in example 4. However, powdered freeze-dried beef (5 to 10%) is added to the denerved meat and is reduced into a paste at the same time as this meat. The water content is this way reduced from 70 to 75% for the trimmings of fresh meat to 65 to 67,5% for the finished product. A smoke aroma is added to the paste before the realization of the slices.

Due to the fact that the product is drier, the colour of the slices is somewhat darker. If it is desired, one can obtain a dark red colour while increasing the temperature of the stamp and of the plate of some degrees or while increasing slightly the time during which the slice is heated between the stamp and the plate.

EXAMPLE 8

Raw ham product

Pork shoulder is left during 48 hours in a refrigerated cell. During this time, it loses 5 to 7% of its weight in moisture. The meat is mechanically denerved and 10 to 15% of freeze-dried low fat pork meat is added, as well as 2.2% of salt, 1.5 g/kg of salpetre and 0.5 g/kg of ascorbic acid. Flavourings may be added if desirable. The meat is comminuted in a cutter in particles of fibres of a size situated between 1 and 2 mm. The paste is allowed to rest for some time so that the moisture is egalized and so that it takes the desired colour. Slices are made the same way as in example 4. The colour of these slices is pale rose but becomes darker if the slice is stored in absence of oxygen.

I claim:

1. A process for making a food product from meat chunks and having the appearance and organoleptic qualities of natural uncooked meat, said food product having a moisture content between approximately 30 and 80% and a fat content less than or equal to 30%, and in which undesirable portions of said meat chunks have been removed comprising the steps of:

forming a substantially smooth and homogenous paste from said meat chunks with a particle size in the range of 2 mm or less;

adding a small quantity of salt sufficient to partially solubilize the proteins in said paste and mixing said salt and paste to partially solubilize a portion of the proteins in said paste;

shaping said paste into slices which are 3 mm or less in thickness; and stabilizing said slices by applying sufficient heat to at least partially coagulate said partially solubilized proteins thereby producing a connective network between the particles of said paste slices without substantially altering the non-solubilized portion of said slices.

2. The process according to claim 1, further comprising the step of reducing the moisture content of said food product by pre-drying said meat before its formation into said smooth and homogeneous paste and before said salting step.

3. The process according to claim 1, further comprising the step of reducing the moisture content of said food product by adding dried meat to said meat chunks before said salting step.

4. The process according to claim 1, further comprising the step of imprinting on the surface of said slices an intaglio or relief pattern.

5. The process according to claim 1, further comprising the step of cooking said slices.

6. The process according to claim 1 comprising the further step of allowing said paste to mature after the addition of said salt to achieve the desired color and to allow said solubilization process to proceed.

7. The process according to claim 1 wherein said salt is added in the amount of at least 0.5% by weight.

8. The process according to claim 1 further comprising the step of adding spices to said paste to achieve a desired flavor.

9. The process according to claim 1 wherein said step of stabilizing said slices includes subjecting said slices to temperatures of from about 55° C. to about 150° C.

10. The process according to claim 9 wherein said slices are subjected to said heat for a period of between about 2 and 120 seconds.

* * * * *